United States Patent
Won et al.

(10) Patent No.: US 8,314,845 B2
(45) Date of Patent: Nov. 20, 2012

(54) METHOD AND SYSTEM FOR MANAGING AN IMAGING DEVICE BY AN ELECTRONIC DEVICE LOCATED REMOTELY TO THE IMAGING DEVICE

(75) Inventors: Eun-Tae Won, Seoul (KR); Giriraj Goyal, Bangalore (IN); Arun Naniyat, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 465 days.

(21) Appl. No.: 12/587,024

(22) Filed: Sep. 30, 2009

(65) Prior Publication Data
US 2010/0079607 A1  Apr. 1, 2010

(30) Foreign Application Priority Data
Sep. 30, 2008  (IN) ............................ 2400/CHE/2008

(51) Int. Cl.
*H04N 5/228*  (2006.01)

(52) U.S. Cl. ................... 348/222.1; 348/207.1; 348/552

(58) Field of Classification Search ............... 348/222.1, 348/207.1, 552; 455/556.1
See application file for complete search history.

(56) References Cited

U.S. PATENT DOCUMENTS

| | | | |
|---|---|---|---|
| 2004/0176118 A1 | 9/2004 | Strittmatter et al. | |
| 2008/0070623 A1* | 3/2008 | Ogawa | 455/556.1 |
| 2009/0176452 A1* | 7/2009 | Hillyard | 455/41.2 |

FOREIGN PATENT DOCUMENTS

| | | |
|---|---|---|
| WO | WO 03/085965 A1 | 10/2003 |
| WO | WO 2004/081713 A2 | 9/2004 |

OTHER PUBLICATIONS

International Search Report dated Apr. 27, 2010 in connection with International Application No. PCT/KR2009/005572.

* cited by examiner

*Primary Examiner* — Yogesh Aggarwal

(57) ABSTRACT

A method and system enables the control of an imaging device by an electronic device located remotely to the imaging device. The method includes displaying a media captured by the imaging device at the electronic device using at least one of Bluetooth basic rate technique and Bluetooth enhanced data rate technique. The method also includes controlling, by the electronic device, properties of the imaging device that are associated with capturing of the media using at least one of Bluetooth low energy technique, the Bluetooth basic rate technique and the Bluetooth enhanced data rate technique, thereby controlling capturing of the media by the imaging device and corresponding display of the media at the electronic device. Further, the method includes controlling of display features of imaging device using at least one of audio video remote control profile and audio video control transport protocol.

14 Claims, 5 Drawing Sheets

METHOD AND SYSTEM FOR MANAGING AN IMAGING DEVICE BY AN ELECTRONIC DEVICE LOCATED REMOTELY TO THE IMAGING DEVICE

CROSS-REFERENCE TO RELATED APPLICATION(S) AND CLAIM OF PRIORITY

The present application is related to and claims the benefit under 35 U.S.C. §119(a) of an Indian Patent Application filed in the Indian Intellectual Property Office on Sep. 30, 2008 and assigned Application No. 2400/CHE/2008, the entire disclosure of which is hereby incorporated by reference.

TECHNICAL FIELD OF THE INVENTION

The present disclosure relates generally to the field of electronic data communication. More particularly, the present disclosure relates to a method and a system for managing remote imaging devices.

BACKGROUND OF THE INVENTION

In current digital age, a user uses a wide variety of electronic devices for the purpose of communication and entertainment, for example, mobile phones, camera, camcorder music players and laptops. Remote exchange of data can also be performed between the electronic devices using one of the many wireless networks, for example a Bluetooth® network. Moreover, methods exist for performing functionalities such as remote controlling of an imaging device by an electronic device. However, technical constraints exist in implementing the functions of remote controlling in a Bluetooth network. Further, it is desired to control the functions quickly and efficiently.

In light of the foregoing discussion there is a need for a method and system for managing remote imaging devices.

SUMMARY OF THE INVENTION

To address the above-discussed deficiencies of the prior art, it is a primary object to provide a method and system for managing an imaging device by an electronic device located remotely to the imaging device.

An example of a method for managing an imaging device by an electronic device located remotely to the imaging device includes displaying a media, captured by the imaging device in real time, at the electronic device in real time using at least one of Bluetooth basic rate technique and Bluetooth enhanced data rate technique. The method also includes controlling, by the electronic device, properties of the imaging device that are associated with capturing of the media. The controlling is performed using at least one of Bluetooth low energy technique, the Bluetooth basic rate technique and the Bluetooth enhanced data rate technique. Further the techniques perform controlling capturing of the media by the imaging device and corresponding display of the media at the electronic device.

Another example of a method for managing an imaging device by an electronic device located remotely to the imaging device using Bluetooth includes using a profile on the imaging device and the electronic device. The profile includes a control command handler. The profile also includes a service discovery and connection handler using at least one of a Bluetooth basic rate technique, a Bluetooth enhanced data rate technique, and a discovery and connection protocol of Bluetooth low energy technique. Further, the profile also includes a media streaming handler. The method also includes establishing a connection between the imaging device and the electronic device using the service discovery and connection handler that uses at least one of the Bluetooth basic rate technique, the Bluetooth enhanced data rate technique, and discovery and connection protocol of Bluetooth low energy technique. Further, the method includes determining control features that are supported by the imaging device and the electronic device using the control command handler. Further, the method includes displaying a replica of a display of the imaging device using the media streaming handler. Furthermore, the method includes controlling, by the electronic device, the control features using the control command handler.

In one embodiment, a system includes an imaging device. A first profile is running on the imaging device. The first profile includes a first control command handler that enables controlling of control features of the imaging device over at least one of a radio frequency communication protocol using a Bluetooth basic rate technique, the radio frequency communication protocol using a Bluetooth enhanced data rate technique, and an attribute protocol of Bluetooth low energy technique. The first profile also includes a first service discovery and connection handler that enables establishing of a connection between the imaging device and the electronic device using at least one of the Bluetooth basic rate technique, the Bluetooth enhanced data rate technique, and a discovery and connection request protocol of the Bluetooth low energy technique. Further, the first profile includes a first media streaming handler that enables displaying a replica of a display of the imaging device. The system also includes an electronic device. A second profile is running on the electronic device. The second profile includes a second control command handler that controls control features of the imaging device over at least one of the radio frequency communication protocol using Bluetooth basic rate technique, the radio frequency communication protocol using Bluetooth enhanced data rate technique, and the attribute protocol of the Bluetooth low energy technique. The second profile also includes a second service discovery and connection handler that establishes a connection between the imaging device and the electronic device using at least one of the Bluetooth basic rate technique, the Bluetooth enhanced data rate technique, and discovery and connection request protocol of the Bluetooth low energy technique. Further, the second profile includes a second media streaming handler that displays a replica of a display of the imaging device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present disclosure.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged imaging device.

Embodiments of the present disclosure described herein provide a method and system for managing an imaging device by an electronic device located remotely to the imaging device. In various embodiments "imaging device" refers to a device that is capable of capturing a media, for example audio, image or video. "Electronic device" refers to a device that is used for controlling functionalities of the imaging device. Control features and properties are used interchangeably in the description and have the same meaning.

Figure 1:
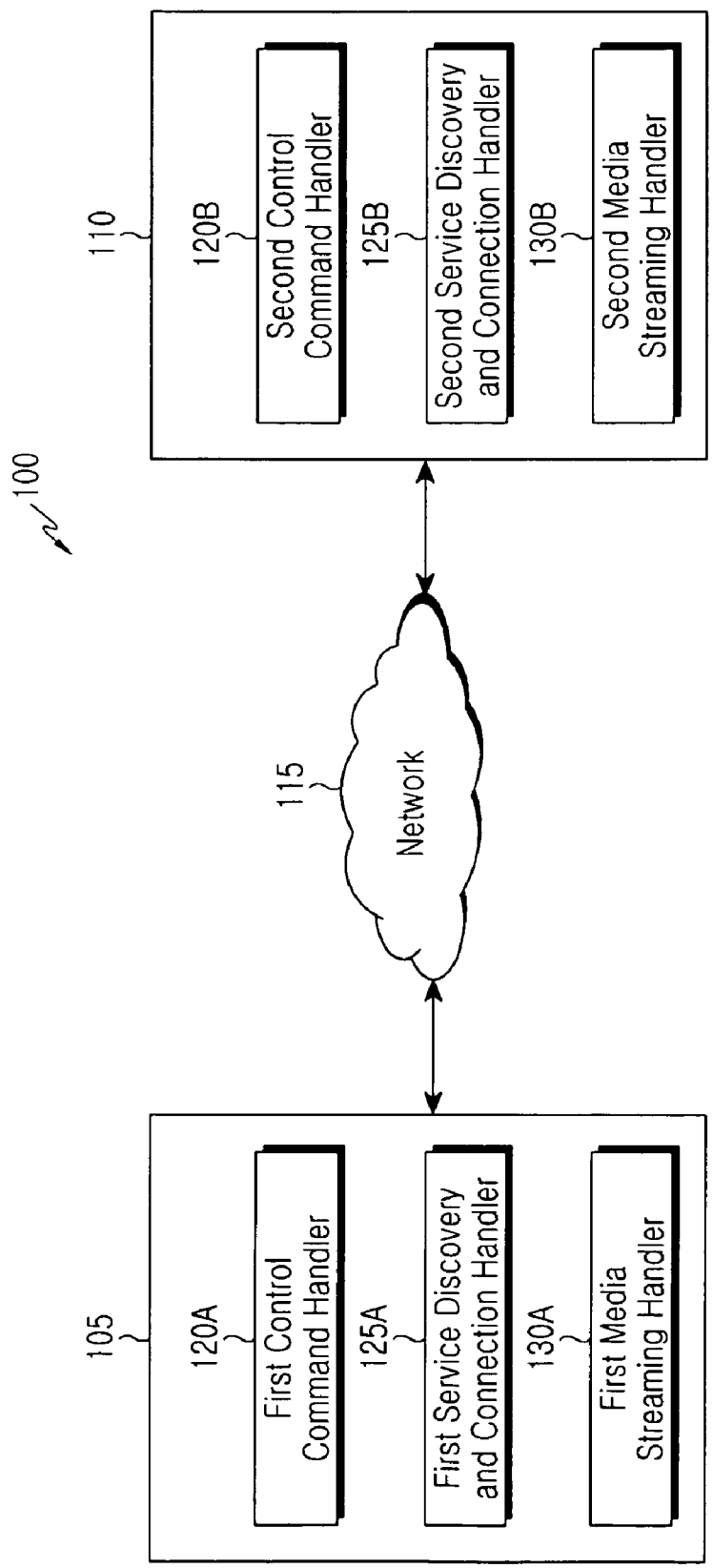
FIG. 1 illustrates a block diagram of an environment in accordance with embodiments of the present disclosure.

FIG. 1 illustrates a block diagram of an environment 100 in accordance with embodiments of the present disclosure.

The environment 100 includes an imaging device 105 and an electronic device 110. The imaging device 105 can be in communication with the electronic device 110 through a network 115. Examples of the imaging device 105 include, but are not limited to a camera, a camcorder, webcam in personal computers and laptops, and camera integrated hand held devices. Examples of the electronic device 110 include, but are not limited to, computer, laptop, mobile device, hand held device, and Personal Digital Assistant (PDA). In one embodiment, the network 115 is a Bluetooth® network.

The imaging device 105 includes a first control command handler 120A that enables controlling of control features of the imaging device 105 over at least one of a radio frequency communication protocol using a Bluetooth basic rate technique, the radio frequency communication protocol using a Bluetooth enhanced data rate technique, and an attribute protocol of Bluetooth low energy technique. Examples of the control features include, but are not limited to, a lens setting, a display setting, a format setting, an environmental setting focus, zoom, shutter speed, resolution, micro mode, purview mode and a video mode. The imaging device 105 also includes a first service discovery and connection handler 125A that enables establishing of a connection between the imaging device 105 and the electronic device 110 using at least one of the Bluetooth basic rate technique, the Bluetooth enhanced data rate technique, and a discovery and connection request protocol of the Bluetooth low energy technique. Further, the imaging device 105 includes a first media streaming handler 130A that enables displaying a replica of a display of the imaging device 105.

The electronic device 110 includes a second control command handler 120B that controls control features of the imaging device 105 over at least one of the radio frequency communication protocol using Bluetooth basic rate technique, the radio frequency communication protocol using Bluetooth enhanced data rate technique, and the attribute protocol of the Bluetooth low energy technique. The electronic device 110 also includes a second service discovery and connection handler 125B that establishes a connection between the imaging device 105 and the electronic device 110 using at least one of the Bluetooth basic rate technique, the Bluetooth enhanced data rate technique, and discovery and connection request protocol of the Bluetooth low energy technique. Further, the electronic device 110 includes a second media streaming handler 130B that displays the replica of a display of the imaging device 105.

In some embodiments, the electronic device 110 can remotely manage the imaging device 105 using the audio video remote control profile or audio video control transport protocol.

Figure 2:
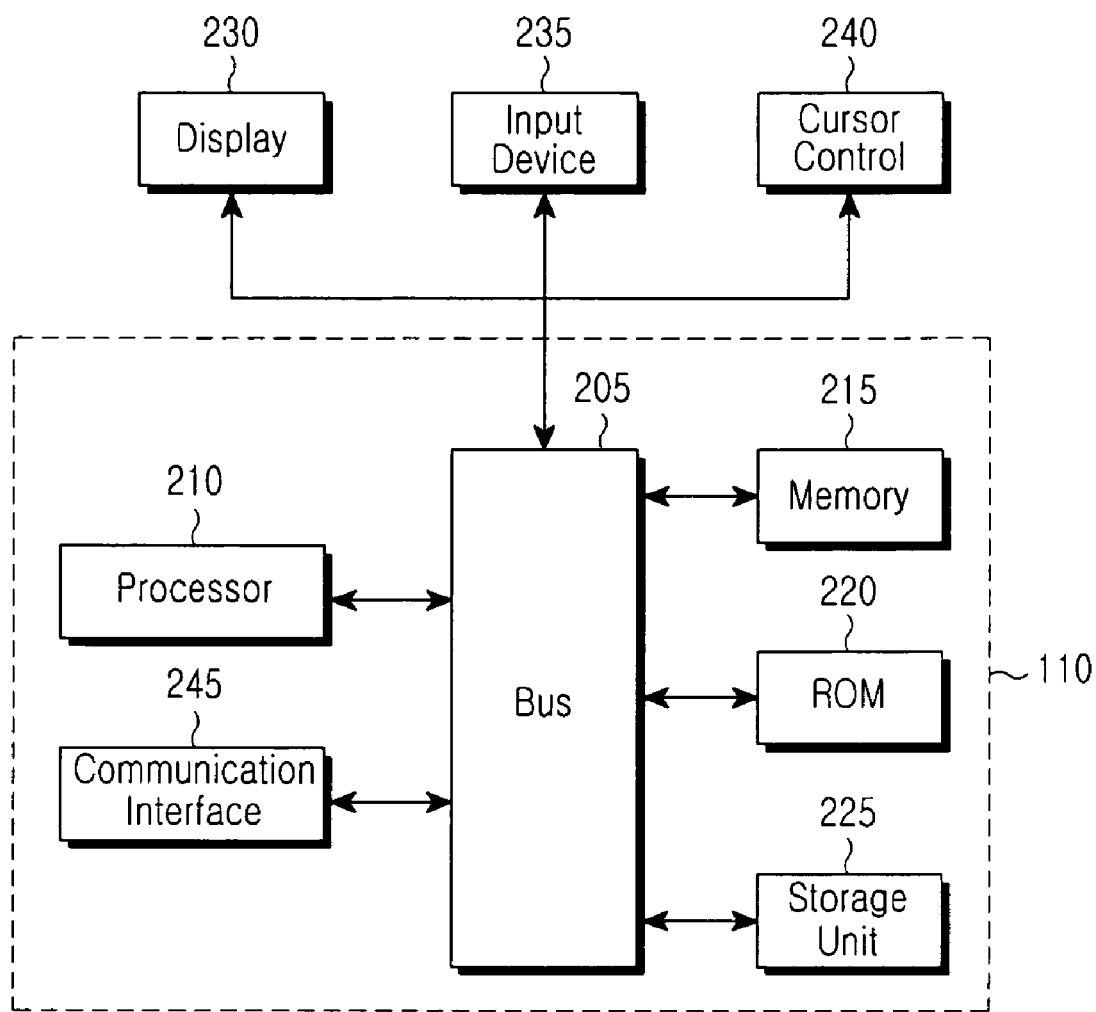
FIG. 2 illustrates a block diagram of an electronic device in accordance with one embodiment of the present disclosure.

The imaging device 105 including the elements is explained in detail in FIG. 2.

FIG. 2 illustrates a block diagram of the imaging device 105 in accordance with one embodiment of the present disclosure. The imaging device 105 includes a bus 205 that can communicate information, and a processor 210 coupled with the bus 205 that can process the information. The imaging device 105 also includes a memory 215, for example, a Random Access Memory (RAM), coupled to the bus 205 for storing information required by the processor 210. The memory 215 can be used for storing temporary information required by the processor 210. The imaging device 105 further includes a Read Only Memory (ROM) 220 coupled to the bus 205 that can store static information required by the processor 210.

The imaging device 105 can be coupled via the bus 205 to a display 230, for example, a Cathode Ray Tube (CRT) or Liquid Crystal Display (LCD), which can display information. An input device 235, including various keys, is coupled to the bus 205 that cancommunicate information to the processor 210. In some embodiments, cursor control 240, for example, a trackball or cursor direction keys, that is able to communicate information to the processor 210 and can control cursor movement on the display 230 can also be present. In one embodiment, the steps of the present disclosure are performed by the imaging device 105 using the processor 210. The information can be read into the memory 215 from a machine-readable medium. In alternative embodiments, hard-wired circuitry can be used in place of or in combination with software instructions to implement various embodiments.

The term machine-readable medium can be defined as a medium providing data to a machine to enable the machine to perform a specific function. The machine-readable medium can be a storage medium. The storage media can include non-volatile media and volatile media. The storage unit 225 can be non-volatile media. The memory 215 can be volatile media. All such media can be configured to be tangible to enable the instructions carried by the media to be detected by a physical mechanism that reads the instructions into the machine.

Examples of the machine readable medium include, but are not limited to, a RAM, a PROM, EPROM, and a FLASH-EPROM.

The imaging device 105 also includes a communication interface 245 coupled to the bus 205 for enabling data communication. Examples of the communication interface 245 include, but are not limited to, an infrared port, a Bluetooth port, a zigbee port, and a wireless port.

In some embodiments, the processor 210 can include one or more processing units for performing one or more functions of the processor 210. The processing units are hardware circuitry performing specified functions.

The one or more functions include enabling display of a media, captured by the imaging device 105 in real time, at the electronic device 110 in real time using at least one of Bluetooth basic rate technique and Bluetooth enhanced data rate technique. The one or more functions also include enabling control, by the electronic device 110, properties of the imaging device 105 that are associated with capturing of the media using at least one of Bluetooth low energy technique, the Bluetooth basic rate technique and the Bluetooth enhanced data rate technique, thereby enabling control of the capturing of the media by the imaging device 105 and corresponding display of the media at the electronic device 110.

In an embodiment, the processor 210 can include the first control command handler 120A, the first service discovery and connection handler 125A, the first media streaming handler 130A to perform the one or more functions of the processor.

In some embodiments, the imaging device 105 can also correspond to the electronic device 110. The one or more functions of the processor 210 of the imaging device 105 acting as the electronic device 110 includes displaying of a media, captured by the imaging device 105 in real time, at the electronic device 110, in real time, using at least one of Bluetooth basic rate technique and Bluetooth enhanced data rate technique. The one or more functions also include controlling, by the electronic device 110, properties of the imaging device 105 that are associated with capturing of the media using at least one of Bluetooth low energy technique, the Bluetooth basic rate technique and the Bluetooth enhanced data rate technique; thereby controlling capturing of the media by the imaging device 105 and corresponding display of the media at the electronic device 110.

In an embodiment, the processor 210 of the imaging device 105 acting as the electronic device 110 can include the second control command handler 120A, the second service discovery and connection handler 125A, the second media streaming handler 130A to perform the one or more functions of the processor.

In some embodiments, the one or more functions can include using a profile on the imaging device 105 and the electronic device 110. The profile includes a control command handler. The profile also includes a service discovery and connection handler using at least one of a Bluetooth basic rate technique, a Bluetooth enhanced data rate technique, and a discovery and connection protocol of Bluetooth low energy technique. Further, the profile also includes a media streaming handler. The one or more functions also includes establishing a connection between the imaging device 105 and the electronic device 110 using the service discovery and connection handler that uses at least one of the Bluetooth basic rate technique, the Bluetooth enhanced data rate technique, and discovery and connection protocol of Bluetooth low energy technique. Further, the one or more functions include determining control features that are supported by the imaging device 105 and the electronic device 110 using the control command handler. Further, the one or more functions also include displaying a replica of a display of the imaging device 105 using the media streaming handler. Furthermore, the method includes controlling, by the electronic device 110, the control features using the control command handler.

Figure 3:
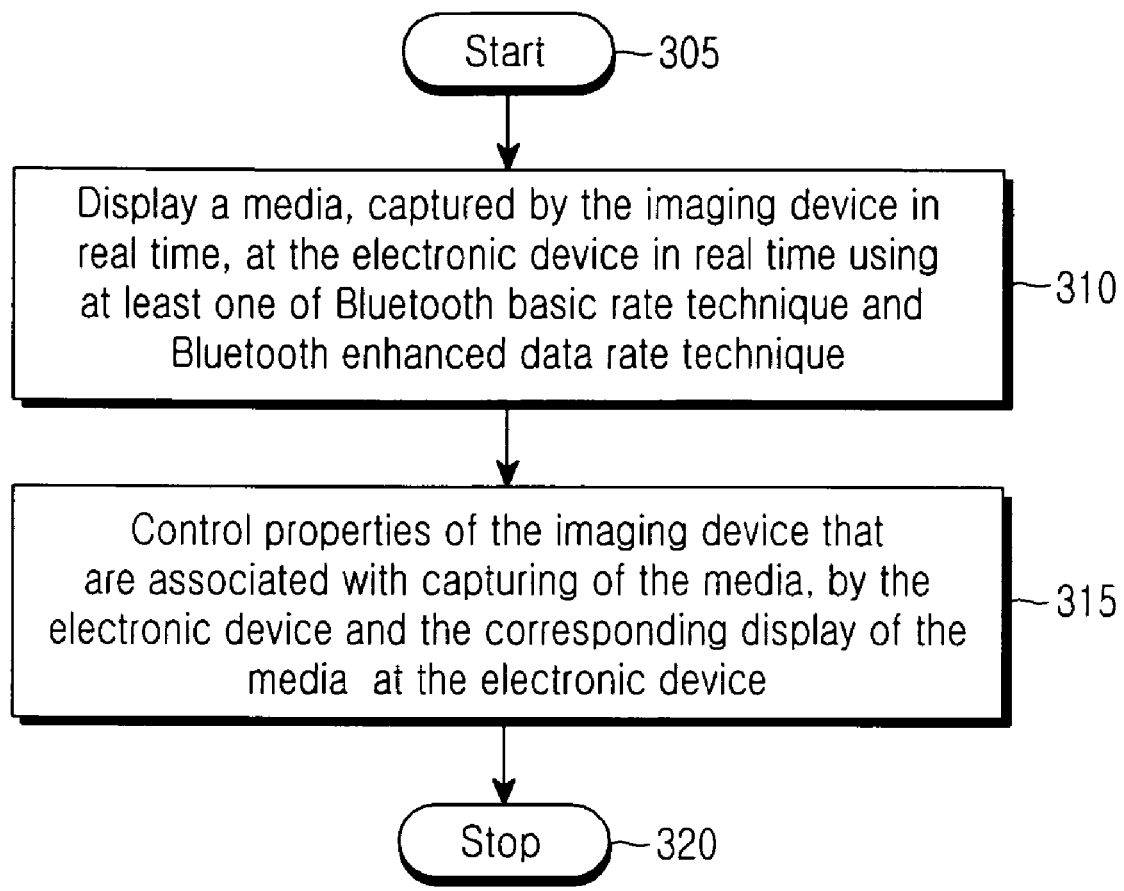
FIG. 3 illustrates a flow diagram for managing an imaging device by an electronic device located remotely to the imaging device in accordance with an embodiment of the present disclosure.

FIG. 3 illustrates a flow diagram for managing an imaging device by an electronic device located remotely to the imaging device in accordance with an embodiment of the present disclosure.

The imaging device can be in communication with the electronic device using a Bluetooth communication technique.

The process starts at step 305.

At step 310, a media captured by the imaging device in real time is displayed at the electronic device in real time. The displaying is performed using at least one of audio video distribution transport protocol over Bluetooth basic rate technique and audio video distribution transport protocol over Bluetooth enhanced data rate technique.

At step 315, properties of the imaging device that are associated with capturing of the media are controlled by the electronic device using at least one of Bluetooth low energy technique, the Bluetooth basic rate technique and the Bluetooth enhanced data rate technique. The techniques are also used for displaying of the captured media at the electronic device.

Examples of the control features include, but are not limited to, a lens setting, a display setting, a format setting, an environmental setting focus, zoom, resolution, shutter speed, micro mode, purview mode and a video mode.

In some embodiments, the step 315 can be performed using a Radio Frequency Communication (RFCOMM) protocol. Attention (AT) commands can be used to communicate control signals over the Bluetooth Radio Frequency Communication (RFCOMM) protocol. The AT commands are exchanged over the RFCOMM protocol using one of the Bluetooth basic rate technique and the Bluetooth enhanced data rate technique.

In some embodiments, the step 315 can be performed using a Bluetooth Low Energy (LE) protocol. A set of attribute commands can be defined using the Bluetooth Low Energy attribute protocol to perform controlling of the imaging device by the electronic device. The Attribute commands are exchanged over attribute protocol of BT LE.

At step 320, the process ends.

Figure 4:
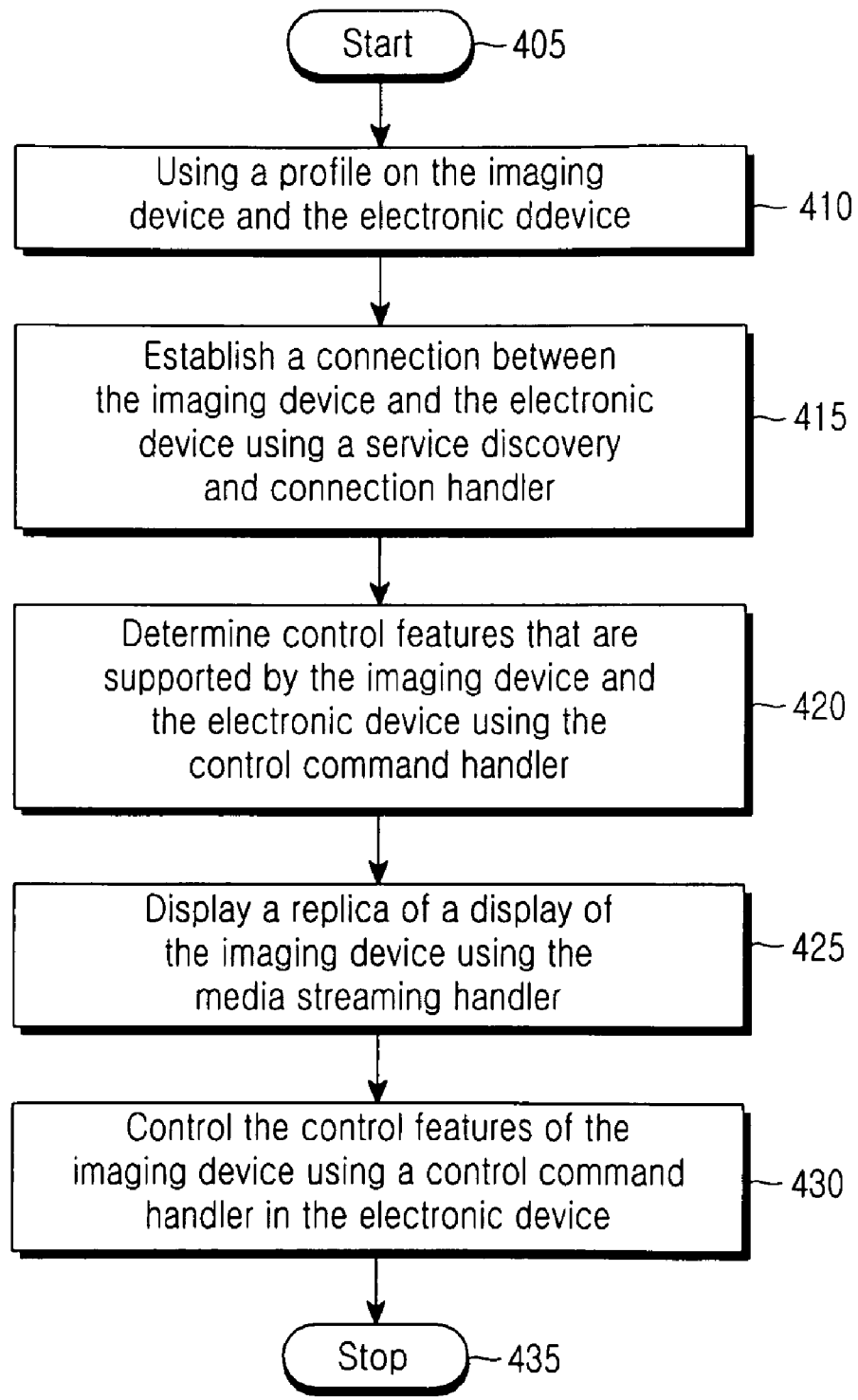
FIG. 4 illustrates a flow diagram for managing an imaging device by an electronic device located remotely to the imaging device in accordance with another embodiment of the present disclosure.

FIG. 4 illustrates a flow diagram for managing an imaging device by an electronic device 110 located remotely to the imaging device in accordance with an embodiment of the present disclosure.

The process starts at step 405.

At step 410, a profile is used on the imaging device and the electronic device 110. The profiles includes a control command handler, a service discovery and connection handler, and a media streaming handler for performing processing functions of the imaging device and the electronic device.

At step 415, a connection is established between the imaging device and the electronic device using a service discovery and connection handler. The control command handler uses at least one of the Bluetooth basic rate technique, the Bluetooth enhanced data rate technique, and discovery and connection protocol of Bluetooth low energy technique. The establishing of connection includes at least one of establishing connection for controlling and establishing connection for streaming.

The connection for controlling includes a service discovery protocol connection for compatibility match of the imaging device and the electronic device using at least one of the Bluetooth basic rate technique and the Bluetooth enhanced data rate technique, then using radio frequency communication protocol connection for control commands. The control commands can be a set of attention (AT commands). The connection for controlling display features of imaging device is established using at least one of an Audio Video Remote Control Profile (AVRCP) and an Audio Video Control Transport Protocol (AVCTP).

In some embodiments, the connection for controlling can be established using discovery and connection request protocol of Bluetooth low energy and controlling using attribute protocol commands. Here, the control commands can be a set of attribute commands.

The connection for streaming includes audio video streaming connection using an audio video distribution transport protocol.

The service discovery and connection handler performs search for compatible devices and handles exchange of data between the connected devices. The service discovery and connection handler is implemented over at least one of the service discovery protocol using at least one of the Bluetooth basic rate technique and the Bluetooth enhanced data rate technique, and discovery and connection request protocol of Bluetooth low energy technique.

At step 420, control features that are supported by the imaging device and the electronic device are determined using the control command handler. Examples of the control features include, but are not limited, to a lens setting, a display setting, a format setting, an environmental setting focus, zoom, shutter speed, micro mode, purview mode and a video mode. Each control feature can include one or more categories, for example, the lens setting can include direction option for lens movement. Examples of the display setting may include, but are not limited to, red eye reduction, purview display, and flash mode. Examples of the format setting may include, but are not limited to, National Television System Committee (NTSC) format and Phase Alternating Line (PAL) format.

At step 425, a replica of a display of the imaging device is displayed using the media streaming handler. The media stream handler uses audio video distribution transport protocol for streaming display including a live captured feed over the network to another display device. In an embodiment, the media streaming handler can stream the display of the imaging device to the electronic device over the Bluetooth network.

At step 430, the control features of the imaging device are controlled using a control command handler in the electronic device. The control command handler uses audio video remote control profile or audio video control transport protocol for performing the controlling of the display features in the imaging device.

The controlling is performed using at least one of AT commands in Bluetooth basic rate technique, AT commands in the Bluetooth enhanced data rate technique, and attribute commands over attribute protocol of Bluetooth low energy technique. The AT commands can be used for selecting the one or more control features. For example, for controlling the movement of the lens, an AT command along with direction key could be sent by the command handler as the controlling signal. A command handler at the imaging device, on receiving the controlling signal performs the movement of the lens based on the direction key pressed.

In some embodiments, the audio video remote control profile can be used by for performing controlling functions on display of imaging devices.

At step 435, the process ends.

Figure 5:
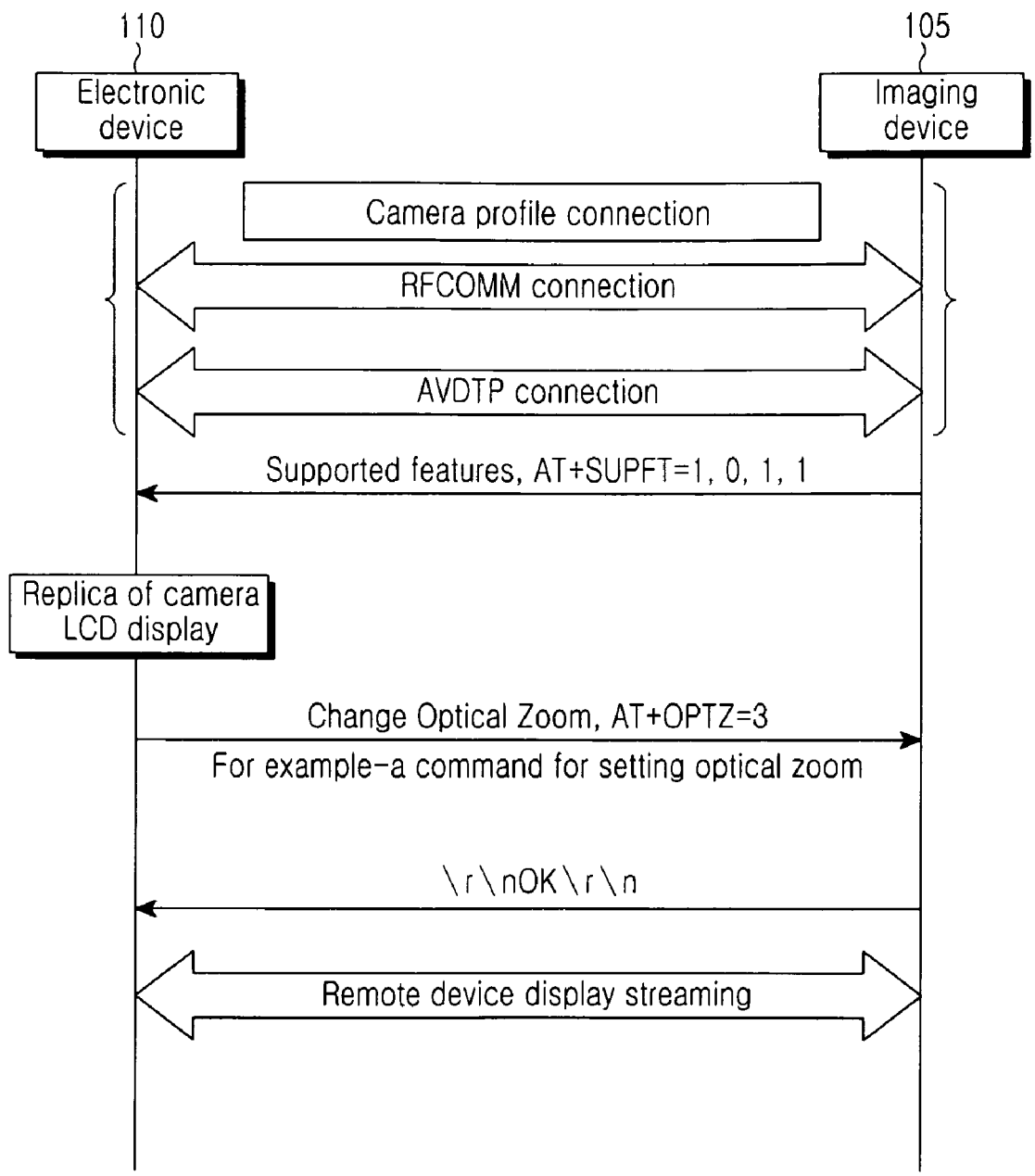
FIG. 5 illustrates flow of operation for performing zoom operation on an imaging device by an electronic device, in accordance with one embodiment of the present disclosure.

FIG. 5 illustrates flow of operation for performing zoom function on an imaging device by an electronic device, in accordance with one embodiment.

Consider the imaging device in connection with an electronic device. In the illustration, the electronic device controls the zoom function of a lens in the imaging device remotely. A camera profile connection is established to enable the remote controlling on the imaging device. Hence, a RFCOMM connection is established for enabling remote controlling of the imaging device. An AVDTP connection is established for audio video streaming. The AVDTP uses one of a Bluetooth basic rate technique and a Bluetooth enhanced data rate technique. Upon establishing the RFCOMM connection and AVDTP connection, the imaging device exchanges supported features with the electronic device, for example control features. The exchanging of the supported features is performed using control command handler. The control command handler can use at least one of RFCOMM using the Bluetooth basic rate technique, RFCOMM using the Bluetooth enhanced data rate technique, and attribute protocol over Bluetooth low energy technique. Further, the data may include parameters corresponding to the control features, for example a zoom factor. In the illustration, the parameters include values indicating features supported by the imaging device.

Upon receiving the control features of the imaging device, a replica of the display of the imaging device is displayed on the electronic device display. In the illustration, the electronic device then sends a command for performing a function, for example an AT command (AT+OPTZ=+3), is sent for performing the zoom function. The AT command also includes a zoom value (+3) indicating level of zooming to be performed. The + sign indicates increasing of zoom level. Upon receiving the AT command, the imaging device acknowledges the signal and performs the zoom function. The display on the imaging device is then streamed using the AVDTP connection.

In some embodiments, the connection for remote controlling can be established using Bluetooth low energy protocol. Attribute commands can be used for performing control functions.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of managing an imaging device by an electronic device located remotely to the imaging device using Bluetooth, the method comprising:
   establishing a connection between the imaging device and the electronic device using a profile on the imaging device and a profile on the electronic device, wherein the connection is established using at least one of a Bluetooth basic rate technique, a Bluetooth enhanced data rate technique, and a discovery and connection protocol of a Bluetooth low energy technique,
   wherein the connection includes a connection for controlling, and wherein establishing the connection for controlling comprises one of:
      establishing the connection for controlling using a service discovery protocol connection for compatibility match of the imaging device and the electronic device using at least one of the Bluetooth basic rate technique and the Bluetooth enhanced data rate technique such that the electronic device controls the imaging device using a radio frequency communication protocol connection for control commands; and
      establishing the connection for controlling using discovery and connection request protocol of Bluetooth low energy such that the electronic device controls the imaging device using attribute protocol commands;

determining control features that are supported by the imaging device and the electronic device;

displaying a replica of a display of the imaging device; and controlling, by the electronic device, the control features.

2. The method of claim 1, wherein at least one of the profiles comprises:
   a control command handler;
   a service discovery and connection handler configured to use at least one of the Bluetooth basic rate technique, the Bluetooth enhanced data rate technique, and the discovery and connection protocol of Bluetooth low energy technique; and
   a media streaming handler.

3. The method of claim 2, wherein determining comprises using the control command handler.

4. The method of claim 2, wherein displaying comprises using the media streaming handler.

5. The method of claim 2, wherein controlling comprises using the control command handler.

6. The method of claim 1, wherein the establishing of the connection further comprises:
   establishing a connection for streaming.

7. The method of claim 6, wherein establishing the connection for controlling further comprises:
   establishing the connection for controlling using at least one of audio video remote control profile and audio video control transport protocol connection for controlling display features of imaging device.

8. The method of claim 7, wherein the controlling display features of imaging device is performed remotely using at least one of the audio video remote control profile and the audio video control transport protocol.

9. The method of claim 7, wherein controlling the imaging device over the radio frequency communication protocol comprises at least one of attention commands using Bluetooth basic rate technique and attention commands using Bluetooth enhanced data rate technique.

10. The method of claim 6, wherein the establishing connection for streaming comprises:
    establishing connection for audio video streaming using an audio video distribution transport protocol.

11. The method of claim 6, wherein the connection for controlling is established over at least one of radio frequency communication protocol using a Bluetooth basic rate technique, a radio frequency communication protocol using a Bluetooth enhanced data rate technique, and over attribute protocol of a Bluetooth low energy technique.

12. The method of claim 1, wherein the controlling is performed remotely using at least one of the control command handler in the Bluetooth basic rate technique, the control command handler in the Bluetooth enhanced data rate technique, and attribute commands in the Bluetooth low energy technique.

13. An imaging device comprising:
    a first control command handler configured to enable controlling of control features of the imaging device over at least one of the radio frequency communication protocol using the Bluetooth basic rate technique, the radio frequency communication protocol using the Bluetooth enhanced data rate technique, and the attribute protocol of Bluetooth low energy technique;
    a first service discovery and connection handler configured to enable establishing of a connection between the imaging device and the electronic device using at least one of the Bluetooth basic rate technique, the Bluetooth enhanced data rate technique, and an discovery and connection request protocol of the Bluetooth low energy technique, wherein the connection includes a connection for controlling and wherein to enable establishment of the connection for controlling, the first service discovery and connection handler is further configured to enable establishing of one of:
       a service discovery protocol connection for compatibility match of the imaging device and the electronic device using at least one of the Bluetooth basic rate technique and the Bluetooth enhanced data rate technique such that the electronic device controls the imaging device using a radio frequency communication protocol connection for control commands; and
       the connection for controlling using discovery and connection request protocol of Bluetooth low energy such that the electronic device controls the imaging device using attribute protocol commands; and
    a first media streaming handler configured to enable displaying a replica of a display of the imaging device.

14. An electronic device configured to control an imaging device disposed remotely from the electronic device, the electronic device comprising:
    a second control command handler configured to control control features of the imaging device over at least one of the radio frequency communication protocol using Bluetooth basic rate technique, the radio frequency communication protocol using Bluetooth enhanced data rate technique, and the attribute protocol of the Bluetooth low energy technique using one of the radio frequency communication protocol connection for control commands and the attribute protocol commands;
    a second service discovery and connection handler configured to establish a connection between the imaging device and the electronic device using at least one of the Bluetooth basic rate technique, the Bluetooth enhanced data rate technique, and discovery and connection request protocol of the Bluetooth low energy technique, wherein the connection includes a connection for controlling and wherein to establish the connection for controlling, the second service discovery and connection handler is further configured to enable establishing of one of:
       a service discovery protocol connection for compatibility match of the imaging device and the electronic device using at least one of the Bluetooth basic rate technique and the Bluetooth enhanced data rate technique such that the electronic device controls the imaging device using a radio frequency communication protocol connection for control commands; and
       the connection for controlling using discovery and connection request protocol of Bluetooth low energy such that the electronic device controls the imaging device using attribute protocol commands; and
    a second media streaming handler configured to display the replica of a display of the imaging device.

* * * * *